United States Patent de Haan

[15] 3,701,116

[45] Oct. 24, 1972

[54] MEMORY STORE WITH REDUNDANCY

[72] Inventor: Hermanes Johannus Maria de Haan, Emmasingel, Eindhoven, Netherlands

[73] Assignee: U.S. Philips Corporation, New York, N.Y.

[22] Filed: July 27, 1971

[21] Appl. No.: 166,614

Related U.S. Application Data

[63] Continuation of Ser. No. 799,466, Feb. 14, 1969, abandoned.

[30] Foreign Application Priority Data

Feb. 19, 1968 Netherlands..............6802365

[52] U.S. Cl. .........................340/173 R, 235/61.12 R

[51] Int. Cl. ............................................G11c 13/00

[58] Field of Search.........340/173 LM; 235/61.12 R, 61.12C

[56] References Cited

UNITED STATES PATENTS

| | | | |
|---|---|---|---|
| 3,042,912 | 7/1962 | Gilbert | 340/347 |
| 3,480,763 | 11/1969 | Ganter | 235/61.12 |

*Primary Examiner*—Terrell W. Fears
*Attorney*—Frank R. Trifari

[57] ABSTRACT

A word-organized memory store wherein information is stored in the form of digitized words along parallel lines in a matrix arranged in stacked relationship with other parallel matrices containing similarly arranged redundant words. The matrices containing redundant words are displaceable in a direction transverse to the direction in which the words are stored.

3 Claims, 4 Drawing Figures

Figure 1:
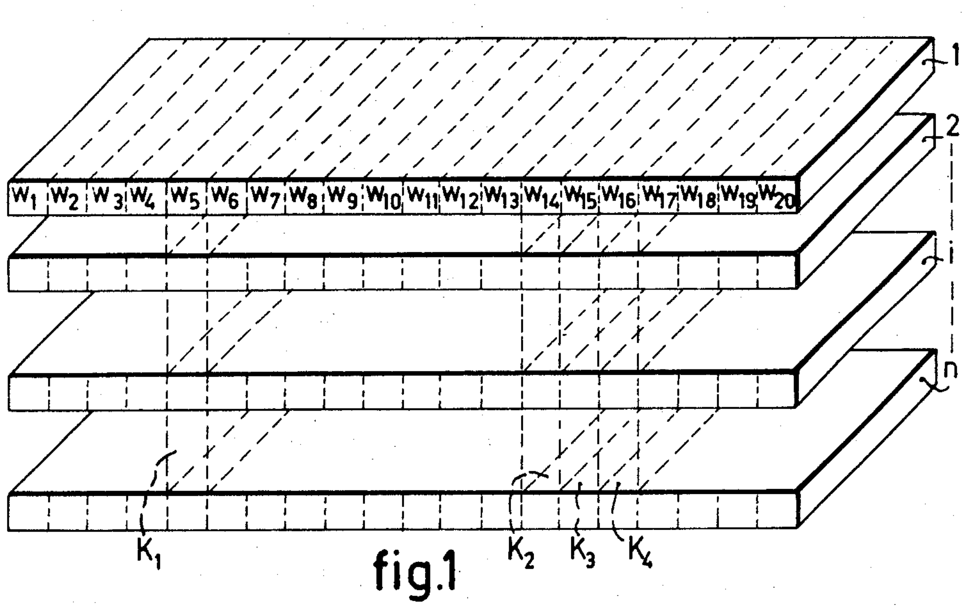

INVENTOR.
HERMANES J.M. DE HAAN

BY
Frank R. Trifari
AGENT

INVENTOR.
HERMANES J.M. DE HAAN
BY
AGENT

MEMORY STORE WITH REDUNDANCY

This application is a continuation of Ser. No. 799,466 filed 2–14–69 and now abandoned.

The invention relates to a word-organized store containing a number of words organized in a given direction and redundant words, a number of store elements being reserved for each word and for each redundant word, and comprising a number of stacked storing matrices.

Such word-organized stores containing redundant words are known. The redundant words are provided to replace erroneous words in the matrices of the store, for example, due to defective or wrongly operating storing elements. A redundant word may itself be erroneous and is then, of course unserviceable. Especially in stores comprising expensive matrices this method is very important, since a matrix having one or more errors is then not definitely unserviceable. In the known device the addresses of the redundant words and the addresses of the erroneous words of the store are recorded in an additional store. When a given word has to be selected, it is first assessed whether the address of the word exists in the additional store. If not, the word, then found to be correct, is directly selected from the store. If it does, the word is wrong and the additional store provides the address of the substitute redundant word in the store, which is then selected. This method requires a great number of additional means and is very expensive, if this additional storage cycle must occupy only a very short time in order not to detract excessively from the accessibility of the store.

A different method of eliminating erroneous words in a store consists in repairing the same. Particularly with matrices obtained by batch production this can be carried out either not at all or only with great difficulty. When a store is extended by a number of redundant words, the connections of this word to the edge of the matrix may be detached, when the word is erroneous, and the connecting points may be connected to a redundant word with the aid of conductors. This method has the disadvantage that the matrix has to be changed, which may be very difficult in practice.

The store according to the invention does not exhibit the aforesaid disadvantages and is characterized in that the matrix contains both words and redundant words and in that in the stack of matrices at least one column of words extending in the direction of stacking is reserved for erroneous words in the matrices. The number of redundant words and the position of the columns intended for the erroneous words can be chosen in dependence upon the number of erroneous words to be expected in the manufacture of the matrices. When in a further development of a store according to the invention the matrices are displaceable during stacking up in their planes transverse of the word direction over one or more word positions it can be ensured by displacing the matrix in said direction that most and in practice all of a maximum number of permissible erroneous words distributed in a given manner in one matrix get into the associated columns for erroneous words. Owing to this displaceability matrices having more arbitrary distributions of erroneous words may still be adapted for use in a stacked memory store. The number of redundant words required for each matrix is then equal to the number of columns reserved for erroneous words in addition to the number of words over which the displacement has to be made. The displaceability in the direction transverse of the word direction in the plane of the matrix may be to the left or to the right. In practice the number of word positions over which the displacement will be carried out to the left and to the right will be approximately equal to half the number of word positions located between two consecutive positions where the columns for the erroneous words are chosen. For facilitating the displacement of a matrix over a given number of words, a matrix may have a number of recesses or one recess and one toothed recess, by which the matrix can be fixed on pins in a plurality of positions spaced apart from each other by one word position of the matrix.

By reserving columns for erroneous words in a store according to the invention the store can be employed without the need for special precautions. The erroneous word columns are simply not connected to input and output circuits.

The percentage of required redundant words may be considerably reduced by arranging the manufactured matrices, when tested with regard to errors, in a number of groups. In each group a number of erroneous words is then permitted. One group may have $n$ erroneous words on one side of the matrices and a further group may have N erroneous words at the center of the matrices and so on. Each group then permits of forming a separate stacked memory store. It is thus possible to use a very great number of matrices in spite of the errors, which would otherwise render them unserviceable.

The invention will be described more fully with reference to the drawing.

In the drawing FIG. 1 shows a word-organized memory store in accordance with the invention.

Figure 3A:
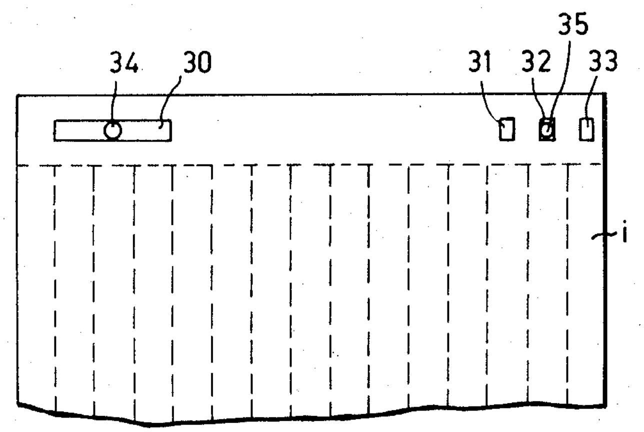
Figure 3B:
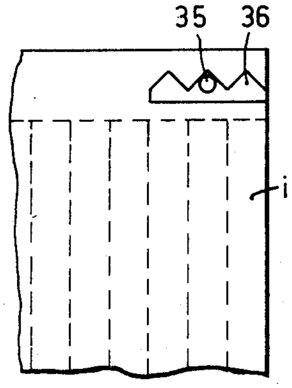
Figure 2:
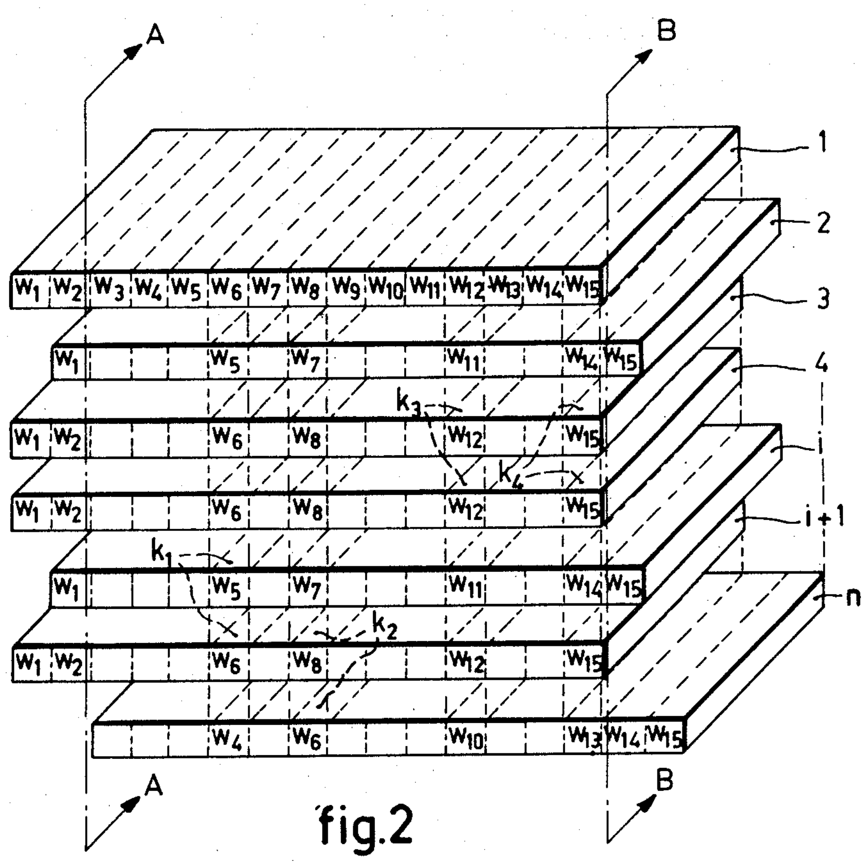

FIG. 2 shows a word-organized store comprising displaceable matrices in a further embodiment of the invention and FIGS. 3*a* and 3*b* show a displaceable matrix of a store as shown in FIG. 2.

FIG. 1 shows part of a word-organized store; 1, 2 . . . $i$ . . . $n$ designate matrices. A matrix may be a magnetic-core matrix, a plate with memory elements formed therein and the like. A matrix comprises a number of rows of memory elements forming each or in conjunction with one or more further rows a word. In the Figure $W_1$, $W_2$ . . . $W_{20}$, which also include the redundant words, designate the words of the matrices 1, 2 . . . $n$. In this example four columns $k_1$, $k_2$, $k_3$, $k_4$, extending as is shown in FIG. 1 through the whole store from top to bottom, preferably over the whole word length of each matrix (transverse of the plane of drawing in the Figure) are reserved for the word errors.

A word is erroneous, when one or more memory elements of the word does not operate correctly or is defective. The number of columns $k$ and the positions thereof are, in practice, chosen so that a group of matrices having a defined erroneous-word distribution assessed in the manufactured matrices is employed to the optimum. The example shown in FIG. 1 is a stacked memory store whose matrices 1 . . . $n$ contain erroneous words at the positions of the words $W_5$, $W_{14}$ $W_{15}$ and $W_{16}$. The columns $k_1$, $k_2$, $k_3$, $k_4$ are located at these positions of the store. The redundance in this example is four words in each matrix.

From the foregoing it will be obvious that by an appropriate group selection a great number of a plurality of matrices containing erroneous words can be used in a simple manner in a store without an excessive redundancy of words.

FIG. 2 shows a word-organized store comprising matrices adapted to be displaced over a number of word positions in their planes transversely of the word direction in a further embodiment of the invention.

References 1, 2 . . . *i*, *i* + 1 . . . *n* designate matrices. In this example again four columns $k_1$, $k_2$, $k_3$, $k_4$ are reserved for erroneous words in the matrices. The column $k_1$ is reserved for the position of an erroneous word $W_6$. If the word $W_5$ of the matrix 2 is erroneous, this matrix is displaced over one word place to the right and arranged in this position in the stacked store. The word $W_5$ then lies in the column $k_1$ reserved for erroneous words. This also applies to the word $W_5$ in the matrix *i*.

In the matrix *n*, for example, the word $W_4$ may be erroneous. By a displacement over two word places to the right the erroneous word $W_4$ also lies in the column $k_1$ reserved for this purpose.

In the same manner the column $k_2$ may be reserved for an erroneous word $W_7$ of the matrix 2. In this case the word $W_8$ of the matrix 1 is also allowed to be erroneous and so on up to and including the word $W_6$ of the matrix *n*.

The column $k_3$ is reserved for any erroneous words $W_{13}$ in the matrix 1, $W_{11}$ in the matrix 2, $W_{12}$ in the matrix 3 and so on.

Finally the column $k_4$ is reserved for erroneous words $W_{15}$ in the matrix 1, $W_{14}$ in the matrix *i* + 1 . . . $W_{13}$ in the matrix *n*. Of the total number of 15 words per matrix four words per matrix are therefore not appropriate by the four columns for being stored in discs or for information reading. Apart therefrom owing to the displacement of the matrix in total two further words per matrix i.e. the words $W_1$ and $W_2$ in the matrix 1, the words $W_1$ and $W_{15}$ in the matrix 2 and so on, can be used in the store only with difficulty, since they are not automatically adapted to the organization of a word-organized store. This means that the words in FIG. 1 on the left-hand side of the line A and on the right-hand side of the line B are also allowed to be erroneous. Consequently, in this example six erroneous words distributed in a given manner in each matrix are permissible. It is also possible to use correct words on the left-hand side of the line A and on the right-hand side of the line B separately beyond the frame of the word-organized store. The same applies, of course, also to correct words in the columns $k_1$, $k_2$ . . . reserved for the erroneous words.

It should be noted that in practice the matrices may be inverted so that a matrix having a number of erroneous words may be inserted into a stack of matrices having defined columns reserved for erroneous words.

It will be obvious from the foregoing that owing to said displaceability of the matrices a still greater number of formerly unserviceable matrices having erroneous words can now be employed.

FIGS. 3a and 3b show examples of displaceable matrices *i* for use in a store of the kind shown in FIG. 2. The matrix *i* in FIG. 3*a* is provided with the recesses 30, 31, 32 and 33 for this purpose. In this example the matrix can be fixed at said places, for example, on pins 34, 35.

The matrix *i* of FIG. 3*b* is provided with a toothed recess 36, instead of the recesses 31, 32, 33, so that this matrix can also be fixed at three places on the pins 34 (not shown) and 35. There are many other means known to those skilled in the art for fixing a matrix in one of a plurality of positions spaced apart from each other by one word place of the matrix.

It should be noted that if, for example, two rows of memory elements in a matrix form a word, an erroneous word may be caused by one or more erroneous memory elements in one of the two rows. A column *k* may then be reserved also for one row, that is to say for half a word. Displacements may then also be carried out over a number of half words. In this case the term "word" in this specification has to denote also half a word or a part of a word formed in a different manner from a row of memory elements.

What is claimed is:

1. A word-organized memory store module for a digital computer, comprising a first memory storage matrix means for storing a plurality of digitized information in the form of words occupying longitudinal parallel positions in the first storage matrix, at least two stored words in the first storage matrix being substantially identical, and a plurality of additional storage matrices aligned in stacked relationship with the first matrix, each of the additional storage matrices having at least two redundant words therein, at least one word column being reserved in the direction of stacking for erroneously recorded words in the matrices of the module.

2. A word-organized store as claimed in claim 1, wherein each of the additional matrices are displaceable in a direction transverse to the direction in which the words are stored, whereby a redundant word in an additional matrix may be aligned with the corresponding word in the first matrix.

3. A word-organized store as claimed in claim 2, further comprising means for fixing each of the additional matrices in a plurality of positions spaced one word apart.

* * * * *